(12) United States Patent
Tsutsumi et al.

(10) Patent No.: US 10,720,629 B2
(45) Date of Patent: Jul. 21, 2020

(54) BIPOLAR BATTERY

(71) Applicant: Exergy Power Systems, Inc., Tokyo (JP)

(72) Inventors: Kaduo Tsutsumi, Tokyo (JP); Taichi Sakamoto, Izumi (JP); Takashi Mukai, Izumi (JP); Yuta Ikeuchi, Izumi (JP); Naoto Yamashita, Izumi (JP)

(73) Assignee: EXERGY POWER SYSTEMS, INC., Tokyo (JP)

( * ) Notice: Subject to any disclaimer, the term of this patent is extended or adjusted under 35 U.S.C. 154(b) by 67 days.

(21) Appl. No.: 16/068,715

(22) PCT Filed: Feb. 26, 2016

(86) PCT No.: PCT/JP2016/055876
§ 371 (c)(1),
(2) Date: Jul. 9, 2018

(87) PCT Pub. No.: WO2017/145378
PCT Pub. Date: Aug. 31, 2017

(65) Prior Publication Data
US 2019/0027732 A1 Jan. 24, 2019

(51) Int. Cl.
*H01M 10/18* (2006.01)
*H01M 2/26* (2006.01)
(Continued)

(52) U.S. Cl.
CPC ......... *H01M 2/266* (2013.01); *H01M 2/1077* (2013.01); *H01M 2/162* (2013.01);
(Continued)

(58) Field of Classification Search
CPC .................. H01M 10/0418; H01M 10/044
See application file for complete search history.

(56) References Cited

U.S. PATENT DOCUMENTS

| 4,262,064 A | 4/1981 | Nagle |
| 5,162,172 A | 11/1992 | Kaun |

(Continued)

FOREIGN PATENT DOCUMENTS

| EP | 3 107 144 A1 | 12/2016 |
| JP | 11-97008 A | 4/1999 |

(Continued)

OTHER PUBLICATIONS

International Search Report dated May 31, 2016, issued in counterpart application No. PCT/JP2016/055876. (2 pages).

(Continued)

*Primary Examiner* — Olatunji A Godo
(74) *Attorney, Agent, or Firm* — Westerman, Hattori, Daniels & Adrian, LLP

(57) ABSTRACT

A conventional bipolar battery is constituted of a combination of cells hermetically sealed for preventing a liquid junction and preventing corrosion of a peripheral device due to a liquid leakage. Therefore, electrolytic solution injecting processes are carried out as many as the number of cells, so that much times and costs have been required for manufacturing a large-scale battery. In addition, a wiring space has been required since the cells are connected to one another with wires. The use of a current collector formed of a one-end closed tubular conductor, the current collector having a bottom protruding outward to form a protrusion, eliminates the wiring space and achieves a reduction in ohmic loss due to the wires. In addition, an electrolytic solution in one cell is separated by a water-repellent sheet from an electrolytic solution in another cell, so that a liquid junction is prevented.

16 Claims, 7 Drawing Sheets

(51) Int. Cl.
  *H01M 10/04* (2006.01)
  *H01M 2/10* (2006.01)
  *H01M 4/80* (2006.01)
  *H01M 4/24* (2006.01)
  *H01M 10/28* (2006.01)
  *H01M 4/74* (2006.01)
  *H01M 2/22* (2006.01)
  *H01M 2/16* (2006.01)
  *H01M 10/613* (2014.01)
  *H01M 10/6563* (2014.01)
  *H01M 4/38* (2006.01)
  *H01M 4/62* (2006.01)
  *H01M 4/70* (2006.01)
  *H01M 10/6235* (2014.01)
  *H01M 10/627* (2014.01)
  *H01M 10/34* (2006.01)

(52) U.S. Cl.
  CPC .......... *H01M 2/1653* (2013.01); *H01M 2/22* (2013.01); *H01M 4/242* (2013.01); *H01M 4/383* (2013.01); *H01M 4/625* (2013.01); *H01M 4/70* (2013.01); *H01M 4/74* (2013.01); *H01M 4/808* (2013.01); *H01M 10/044* (2013.01); *H01M 10/0418* (2013.01); *H01M 10/282* (2013.01); *H01M 10/613* (2015.04); *H01M 10/6563* (2015.04); *H01M 10/345* (2013.01); *H01M 10/627* (2015.04); *H01M 10/6235* (2015.04); *H01M 2220/10* (2013.01); *H01M 2220/30* (2013.01)

(56) References Cited

U.S. PATENT DOCUMENTS

| 5,441,824 | A | * | 8/1995 | Rippel | H01M 10/0413 429/152 |
| 6,083,642 | A | | 7/2000 | Kato et al. | |
| 2008/0248335 | A1 | * | 10/2008 | Kinoshita | H01M 10/0418 429/7 |
| 2009/0233164 | A1 | | 9/2009 | Shimamura et al. | |
| 2010/0236854 | A1 | * | 9/2010 | Nakamura | B60K 1/04 180/68.5 |
| 2011/0052965 | A1 | | 3/2011 | Kim et al. | |
| 2015/0132637 | A1 | | 5/2015 | Tsutsumi | |

FOREIGN PATENT DOCUMENTS

| JP | 2008-186595 A | 8/2008 |
| JP | 2011-151016 A | 8/2011 |
| JP | 2013-37946 A | 2/2013 |
| WO | 2014/092031 A1 | 6/2014 |
| WO | 2015/118892 A1 | 8/2015 |

OTHER PUBLICATIONS

Extended Search Report dated Oct. 7, 2019, issued in counterpart EP Application No. 16891535.3 (9 pages).

* cited by examiner

BIPOLAR BATTERY

TECHNICAL FIELD

The invention relates to a structure of a bipolar battery and specifically to a structure of a bipolar battery that prevents an ionic short circuit in a battery pack.

BACKGROUND ART

A bipolar battery refers to a battery in which electrodes each including a current collector, a positive electrode active material layer disposed on a first face of the current collector, and a negative electrode active material layer disposed on a second face of the current collector are stacked with a separator interposed therebetween. Bipolar batteries have been widely used as power supplies for electric vehicles and various electronic devices since they relatively easily conduce, for example, an increase in voltage, a reduction in parts count, a reduction in resistance between cells, and an increase in energy density owing to space savings.

Patent Literature 1 discloses a bipolar battery including a separator holding an electrolyte layer formed of a polymer gel electrolyte or a liquid electrolyte, and a sealing resin disposed by molding on an outer periphery of the separator to prevent a liquid junction (short circuit) due to exudation of an electrolytic solution from the electrolyte portion.

Patent Literature 2 discloses a bipolar battery for which a nonaqueous electrolytic solution is employed, the bipolar battery including: a sealing member containing a modified polyolefin resin graft modified using a compound including an ethylenic double bond and an epoxy group in the same molecule; and a bipolar electrode that is free from electrolytic solution exudation and is excellent in sealing property.

In a bipolar battery, battery elements are coated with resin which may decrease the heat transferability, that is, the ability of the battery to transfer heat generated in the battery to the outside. In view of this, Patent Literature 3 proposes a secondary battery as a bipolar battery capable of efficient dissipation of heat generated in the battery to the outside, by use of ceramic with high electrical resistance and excellent heat transferability, as a material for a battery coating member.

In an alkaline secondary battery, nickel hydroxide and manganese dioxide to be used as a positive electrode active material each are a metal oxide with considerably low conductivity. In order to overcome this disadvantage, for example, Patent Literature 4 discloses an active material obtained by adding a higher-order cobalt oxide as a conductive agent to nickel hydroxide. According to this active material, the higher-order cobalt oxide forms a conductive network between the nickel hydroxide particles. This conductive network promotes a charge-discharge reaction at the entire nickel hydroxide particles, leading to an increase in capacity.

CITATIONS LIST

Patent Literatures

Patent Literature 1: JP 2011-151016 A
Patent Literature 2: JP 2013-037946 A
Patent Literature 3: JP 2008-186595 A
Patent Literature 4: JP H11-97008 A

SUMMARY OF INVENTION

Technical Problems

A conventional battery pack is constituted of a combination of cells each including a positive electrode, a negative electrode, and an electrolytic solution. The cells are hermetically sealed for preventing carbonic acid degradation of the electrolytic solution and corrosion of a peripheral device due to liquid leakage. The cells are electrically connected to one another with connection parts such as wires. The resistance at the connection parts of the wires causes a reduction in output. In consideration of a downsizing of the battery pack, the connection members and members for hermetic seal, for example, members having no direct bearing on electricity production, such as a lid, lower the power density and energy density of the battery pack. In addition, a large parts count leads to an increase in processes required for assembly.

In a bipolar battery including a stack of bipolar electrodes, exudation of an electrolytic solution contained in an electrolyte of each electrode results in a liquid junction to electrically connect the electrodes to each other. The liquid junction considerably lowers the ability of the battery.

In a bipolar battery, hermetically sealed cells have been used for preventing a liquid junction due to shared use of an electrolytic solution between the cells. Therefore, electrolytic solution injecting processes are carried out as many as the number of cells, so that much times and costs have been required for manufacturing a large-scale battery pack.

Not only bipolar batteries, but also secondary batteries have been generally required to have a high output characteristic. When charge and discharge are performed with high power, that is, at a high charge-discharge rate, the internal temperature of a secondary battery rises to a high temperature, so that an active material of an electrode is damaged. For this reason, the charge-discharge rate is limited, which makes it difficult to achieve a higher output characteristic.

Instead of a higher-order cobalt oxide that is expensive for use as a conductive agent, the use of a graphitized carbon material as a conductive agent achieves satisfactory conductivity. However, the graphitized carbon material is inferior in corrosion resistance. Therefore, the carbon material is degraded by oxidation through repetitive charge and discharge, so that the conductivity thereof is gradually lowered. Oxygen generated from a positive electrode in charging causes oxidation of a hydrogen storage alloy of a negative electrode, which lowers the hydrogen storage ability of the hydrogen storage alloy.

In view of the above circumstances, the invention provides a bipolar battery capable of uniform electrolytic solution injection into electrode units without occurrence of an ionic short circuit (liquid junction) even when an electrolytic solution is injected into the bipolar battery with the cells stacked. The invention is also directed to reduce processes for assembly by reducing a parts count, to achieve larger capacity and higher energy density while decreasing a volume of a battery, and to achieve a higher output characteristic by reducing the number of wires to suppress the resistance at connection parts.

Solutions to Problems

In order to attain the objects, a bipolar battery of the invention includes: a plurality of current collectors; and a power generating element including a stack of a positive electrode, a negative electrode, and a separator interposed between the positive electrode and the negative electrode. The current collectors are respectively formed of a one-end closed tubular conductor and have bottoms protruding outward to form protrusions. The protrusions penetrate the power generating element along an axial direction of the current collectors. A first electrode which is one of the positive electrode and the negative electrode is in contact with an inner face of a tubular body of a first current collector of the plurality of current collectors, is electrically connected to the first current collector, and is not in contact with a second current collector of the plurality of current collectors. A second electrode which is the other one of the positive electrode and the negative electrode is not in contact with the first current collector, is in contact with an outer face of a protrusion of the second current collector, and is electrically connected to the second current collector. In this configuration, each of the current collectors includes a tubular body and a protrusion. The tubular body is formed of a conductive tubular member, and the protrusion protrudes outward in an axial direction of the tubular body.

This configuration needs no wires for connecting cells to one another and therefore prevents a reduction in output due to the resistance at the wires. In addition, this configuration needs no wires, lids for cells, and other components and therefore achieves a downsizing of the bipolar battery. It can therefore be expected to increase the capacity of the bipolar battery. It can also be expected to improve the energy density of the bipolar battery, thereby achieving a higher output characteristic of the bipolar battery. This configuration also achieves reductions in parts count and processes for assembly.

The respective cells are connected to one another with the current collectors larger in sectional area than wires. This configuration therefore achieves a higher output characteristic of the bipolar battery with lower resistance. This configuration also reduces an ohmic loss. In addition, since the electrodes are stacked, heat generated from the electrodes in charging and discharging is promptly transferred to the outside via the current collectors. This configuration restricts a rise in internal temperature of the battery and achieves a higher output characteristic of the battery.

In the bipolar battery of the invention, the second electrode has an outer edge covered with the separator, and the first electrode has a hole through which the second current collector passes, the hole having a peripheral edge covered with the separator.

The bipolar battery of the invention further includes an insulator interposed between the first current collector and the second current collector. According to this configuration, the insulating sheet electrically insulates the upper and lower stacked current collectors from each other.

The bipolar battery of the invention further includes a water-repellent sheet disposed on an inner side of each of the current collectors and located between the corresponding protrusion and the power generating element. According to this configuration, the water-repellent sheet repels water and has an insulating property, thereby preventing a liquid junction between the cells. An electrolytic solution and hydrogen gas supplied into the bipolar battery through holes formed in the top sides of the protrusions of the current collectors are supplied to the respective cells through the water-repellent sheets. This configuration enables prevention of a liquid junction with a simple structure and eliminates a necessity of electrolytic solution injection for each cell, which leads to reductions in manufacturing processes and manufacturing costs.

In the bipolar battery of the invention, the water-repellent sheet is formed of a micro-porous film or a polyolefin nonwoven fabric. In this configuration, the water-repellent sheet is preferably made of polyethylene or polypropylene.

In the bipolar battery of the invention, a first electrode of one power generating element is in contact with the inner face of the tubular body of the first current collector, and a second electrode of another power generating element is in contact with the outer face of the protrusion of the second current collector. Also in the bipolar battery of the invention, each of the current collectors is formed of a nickel-plated steel plate.

The bipolar battery of the invention further includes: a negative electrode terminal plate; a positive electrode terminal plate; and a through-bolt coated with an insulating tube and configured to join the negative electrode terminal plate and the positive electrode terminal plate together, with the current collectors stacked concentrically and sandwiched between the negative electrode terminal plate and the positive electrode terminal plate. According to this configuration, the current collectors are stacked in the axial direction of the bipolar battery. This configuration therefore achieves a downsizing of the battery. The bipolar battery of the invention further includes a connection fitting formed of a conductive flat member and mounted to two ends of the through-bolt, the connection fitting including a flat plate portion and an extension portion bent from the flat plate portion in a direction substantially perpendicular to a direction along the negative electrode terminal plate and the positive electrode terminal plate.

In the bipolar battery of the invention, of the stacked current collectors, an opening direction-end current collector is not provided with a tubular body. According to this configuration, the current collector constituting the lowermost cell is not provided with a tubular body. This configuration therefore eliminates a dead space and achieves an increase in capacity of the battery.

In the bipolar battery of the invention, one of the first electrode and the second electrode is a negative electrode containing a hydrogen storage alloy, and the other electrode is a positive electrode containing a positive electrode active material and a conductive agent, the conductive agent includes carbon, and hydrogen gas is filled in the bipolar battery. According to this configuration, since oxygen generated in the battery is bound to the hydrogen gas filled in the battery to form water, the conductive agent in the positive electrode is not oxidized.

The bipolar battery of the invention further includes a hydrogen storage chamber configured to store hydrogen gas generated by electrolysis of an electrolytic solution retained in the bipolar battery and hydrogen gas supplied externally. According to this configuration, the battery is overcharged to generate hydrogen gas.

In the bipolar battery of the invention, the conductive agent includes partly graphitized soft carbon. Also in the bipolar battery of the invention, the separator is formed of a polyolefin nonwoven fabric. Also in the bipolar battery of the invention, the separator has a hydrophilic property.

A battery pack of the invention includes: a plurality of bipolar batteries each of which is the bipolar battery described above, the bipolar batteries being arranged in a direction perpendicular to an axial direction of the bipolar batteries; and an air blower configured to supply air in the direction perpendicular to the axial direction of the bipolar batteries. The direction of supplying air from the air blower is parallel to a direction in which the extension portion of the connection fitting extends. In this configuration, the connection fitting plays a role of transmitting electricity and has a function of disturbing a flow of cooling air from the air blower to enhance cooling performance.

Advantageous Effects of Invention

The bipolar battery enables electrolytic solution injection with the cells stacked. The bipolar battery also enables uniform injection of an electrolytic solution into the respective electrode units without occurrence of an ionic short circuit (liquid junction). In addition, the bipolar battery employs a current collector having a specific structure, thereby achieving its higher output characteristic and larger capacity.

DESCRIPTION OF EMBODIMENTS

Figure 1A:
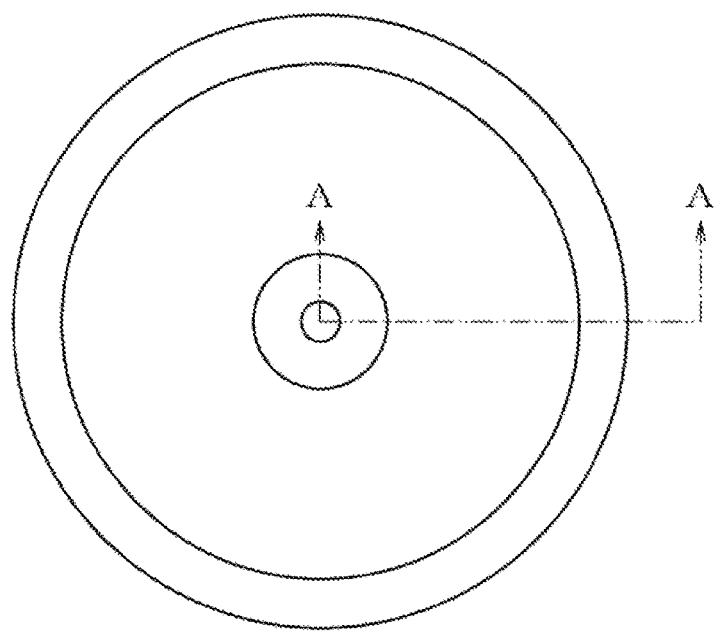
FIG. 1A is a plan view of a current collector.

Embodiments of the invention will be described below with reference to the drawings; however, the invention is not limited to these embodiments.

Prior to a description on each embodiment of the invention, a description will be given of a nickel-metal hydride battery as an example of a secondary battery to which the invention is applied. A secondary battery type is not limited to the nickel-metal hydride battery. Examples of the secondary battery may include, but not limited to, a manganese dioxide battery, a lithium-ion battery, and a nickel-zinc battery. For convenience of the description, a first electrode is referred to as a positive electrode, and a second electrode is referred to as a negative electrode.

Examples of a hydrogen storage alloy for use in the negative electrode may include, but not limited to, an AB5 rare earth alloy, an AB2 Laves phase alloy, an AB titanium-zirconium alloy, and an A2B magnesium alloy. In particular, the hydrogen storage alloy is preferably an AB5 rare earth-nickel alloy, that is, a quinary alloy containing MmNiCoMnAl misch metal from the viewpoints of a hydrogen storage capacity, a charge-discharge characteristic, a self-discharge characteristic, and a cycle life characteristic.

A positive electrode active material is not particularly limited so long as to be usable for a positive electrode of an alkaline secondary battery, and examples thereof may include nickel hydroxide and manganese dioxide. A conductive agent for the positive electrode preferably includes a carbon material that is less prone to being reduced by hydrogen and being eluted in an electrolytic solution in discharging.

Amorphous carbon is preferably used from the viewpoints of the durability of the electrolytic solution and oxidation resistance in charging. In particular, soft carbon is preferably used. The soft carbon refers to carbon having a graphite structure, that is, a structure of regularly laminated hexagonal network planes constituted of carbon atoms, which is easily developed when being subjected to heat treatment in an inert atmosphere. The soft carbon is also referred to as easily graphitizable carbon. The graphite refers to carbon obtained by graphitizing the soft carbon.

With regard to the soft carbon, the use of partly graphitized carbon is preferred. In particular, the use of soft carbon having a graphitized surface is preferred. Soft carbon, which is excessively graphitized, is easily degraded. On the other hand, soft carbon, which is not graphitized so much, does not contribute to improvement in conductivity. The ratio of graphitization is preferably 10 to 90 wt %, more preferably 20 to 60 wt % relative to 100 wt % of the entire soft carbon. The positive electrode containing the carbon material described above realizes a secondary battery with an excellent cycle life characteristic.

Positive and negative electrode substrates are preferably made of Ni from the viewpoints of high electric conductivity, favorable stability in an electrolytic solution, and good oxidation resistance. Specifically, the positive and negative electrode substrates are each preferably formed of a foamed nickel substrate or a nickel-plated steel plate.

A positive electrode active material powder, a binder, and a conductive powder are mixed and kneaded into a paste. The paste is applied to or filled in an electrode substrate. The resultant electrode substrate is dried and then is subjected to rolling using a roller press or the like. A positive electrode is thus fabricated.

Likewise, a hydrogen storage alloy powder, a binder, and a conductive powder are mixed to prepare a paste. The paste is applied to or filled in an electrode substrate. The resultant electrode substrate is dried and then is subjected to rolling using a roller press or the like. A negative electrode is thus fabricated.

An electrolyte is not particularly limited so long as to be used for a battery in which an active material is hydrogen. For example, a favorable electrolyte is an aqueous solution of a salt such as potassium hydroxide (KOH), lithium hydroxide (LiOH), or sodium hydroxide (NaOH). An electrolytic solution is preferably an aqueous potassium hydroxide solution from the viewpoint of a battery output characteristic.

A separator may be formed of a micro-porous film, a woven fabric, nonwoven fabric, or a powder compact. In particular, a nonwoven fabric is preferred from the viewpoints of an output characteristic and a fabrication cost. The separator is made of a material which is not particularly limited, but preferably has alkali resistance, oxidation resistance, and reduction resistance. Specifically, the separator is preferably made of a polyolefin fiber such as polypropylene or polyethylene.

A polyolefin fiber, which has a hydrophobic property, needs to be subjected to hydrophilic treatment. The separator to be used in a hydrogen gas atmosphere is preferably subjected to fluorine gas treatment. The separator is also preferred in a state in which a metal oxide is applied to a surface thereof or the surface is coated with the metal oxide.

A current collector is preferably made of Ni from the viewpoints of high electric conductivity, favorable stability in an electrolytic solution, and good oxidation resistance. Specifically, the current collector is formed of a nickel-plated steel plate. Nickel plating prevents the current collector from being corroded due to the electrolytic solution in the separator.

First Embodiment

FIG. 1A is a plan view of a current collector in a bipolar battery according to a first embodiment of the invention.

Figure 1B:
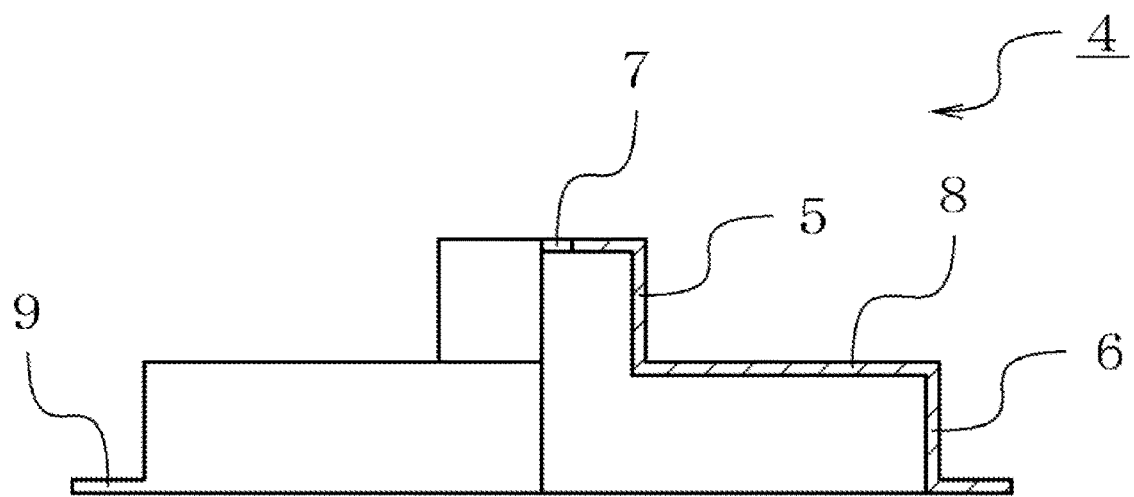
FIG. 1B is a side view of the current collector and is a partial sectional view taken along a line passing a center as seen in a transverse width direction.

FIG. 1B is a partial sectional view of a side face of the current collector. In other words, FIG. 1B is a sectional view taken along line A-A in the plan view of FIG. 1A. A current collector 4 is a one-end closed cylindrical can formed of a nickel-plated steel plate, and the bottom of the cylindrical can protrudes outward in an axial direction of the cylindrical can to form a protrusion 5. Accordingly, the current collector 4 includes a tubular body 6 corresponding to the cylindrical can, the protrusion 5 corresponding to the bottom of the cylindrical can, and a flat shoulder 8 connecting the tubular body 6 to the protrusion 5.

The protrusion 5 has a hole 7 in its top side, and a space enclosed with the current collector 4 communicates with an external space through the hole 7. The tubular body 6, the protrusion 5, and the hole 7 are concentric with one another. This embodiment employs the one-end closed cylindrical can. Alternatively, this embodiment may also employ a tubular member having an ellipse or rectangular cross section. The current collector 4 also has a flange 9 formed at an opening of the tubular body 6 so as to extend from the tubular body 6 outward in a radial direction of the current collector 4. The flange 9 acts as a cooling fin, serves as a seat for an insulating sheet 14 to be described later, and functions as a margin for hermetically sealing a battery.

Figure 2A:
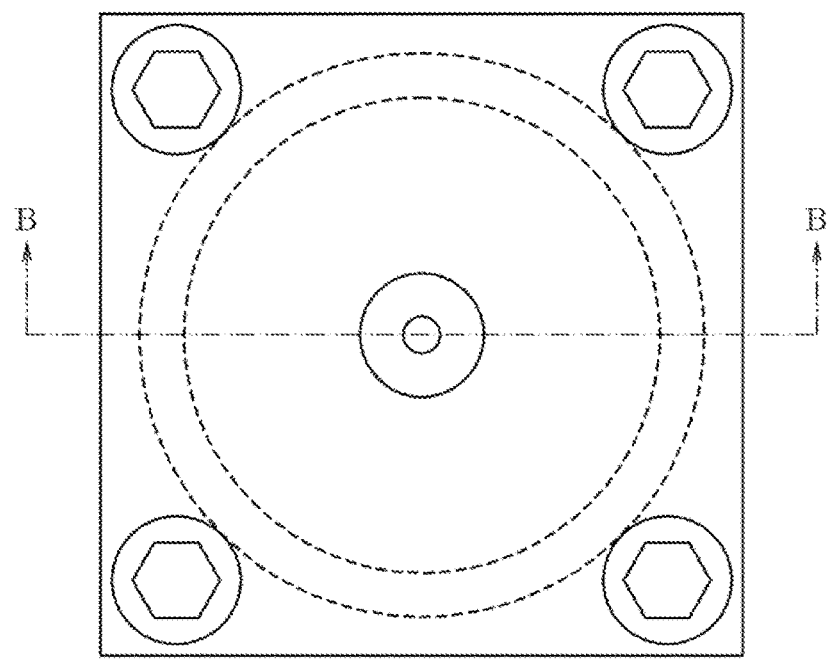
FIG. 2A is a plan view of constituent elements of a bipolar battery.
Figure 2B:
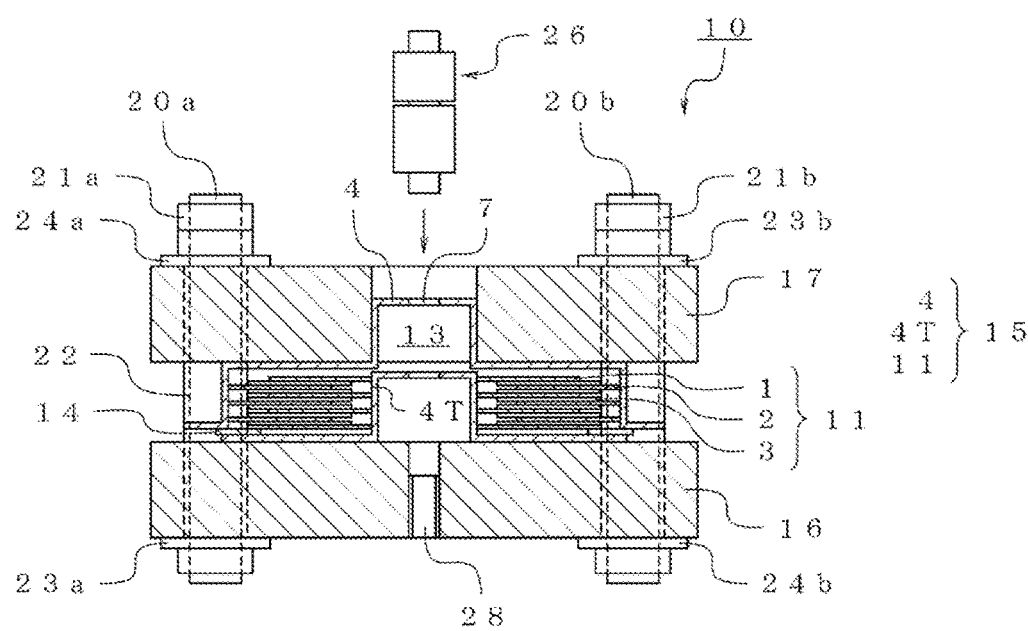
FIG. 2B is an axial sectional side view of the constituent elements of the bipolar battery.

FIG. 2A is a plan view of constituent elements of the bipolar battery according to the first embodiment of the invention. FIG. 2B is a sectional view taken along line B-B in the plan view of FIG. 2A. A bipolar battery 10 includes, as main constituent elements, two current collectors 4, and an electrode unit 11 accommodated in a space defined by the current collectors 4. Both the current collectors 4 may be the current collector illustrated in FIGS. 1A and 1B. In this embodiment, a lower one of the current collectors is not provided with a tubular body in order to achieve a more compact structure. The current collector, which is not provided with a tubular body, is referred to as an end current collector 4T. However, the current collector 4 and the end current collector 4T are collectively referred to as current collectors 4 in cases where there is no necessity to describe the current collector 4 and the end current collector 4T as distinguished from each other.

The electrode unit 11 serves as a power generating element and includes a negative electrode 1 containing a hydrogen storage alloy, a positive electrode 2 containing a positive electrode active material, and a separator 3 interposed between the negative electrode 1 and the positive electrode 2 to permit ion transmission, but prohibit electron transmission. The negative electrode 1, the positive electrode 2, and the separator 3 are stacked in an axial direction of the current collectors 4, and the electrode unit 11 is accommodated in the space defined by the current collectors 4. Each of the negative electrode 1, the positive electrode 2, and the separator 3 has a hole at its center, and a protrusion 5 of the end current collector 4T passes through the holes. The protrusion 5 of the end current collector 4T penetrates the center of the electrode unit 11 including the positive electrode 2, the negative electrode 1, and the separator 3, in the axial direction of the end current collector 4T.

A description will be given of dimensional relationships between the negative electrode 1 and positive electrode 2 and the current collectors 4. A diameter of the hole in the negative electrode 1 is smaller than an outer diameter of the protrusion of the end current collector 4T. Accordingly, a peripheral edge of the hole in the negative electrode is in contact with the protrusion of the end current collector 4T, so that the negative electrode 1 is electrically connected to the end current collector 4T. On the other hand, a diameter of the hole at the center of the positive electrode 2 is larger than the outer diameter of the protrusion of the end current collector 4T. Therefore, a peripheral edge of the hole in the positive electrode is not in contact with the protrusion of the end current collector 4T, and the positive electrode 2 is electrically insulated from the end current collector 4T.

An outer diameter of the negative electrode 1 is smaller than an inner diameter of the tubular body of the current collector 4. Therefore, an outer edge of the negative electrode is not in contact with an inner face of the tubular body of the current collector 4, and the negative electrode is electrically insulated from the current collector 4. On the other hand, an outer diameter of the positive electrode 2 is larger than the inner diameter of the tubular body of the current collector 4. Therefore, an outer edge of the positive electrode 2 is in contact with the inner face of the tubular body of the current collector 4, so that the positive electrode 2 is electrically connected to the current collector 4. The diameter of the hole in the negative electrode is slightly smaller than an outer diameter of the protrusion, and the outer diameter of the positive electrode 2 is slightly larger than the inner diameter of the tubular body.

Next, a description will be given of a dimensional relationship between the negative electrode 1 and the separator 3 and a dimensional relationship between the positive electrode 2 and the separator 3. An outer edge of the separator 3 is covered with the positive electrode 2, and an outer edge of the negative electrode 1 is covered with the separator 3. The peripheral edge of the hole in the positive electrode 2 is covered with the separator 3, and a peripheral edge of the hole in the separator 3 is covered with the negative electrode 1.

More specifically, an outer diameter of the separator 3 is larger than the outer diameter of the negative electrode 1. Therefore, the negative electrode 1 and the positive electrode 2 are completely separated from each other by the separator 3 in the vicinity of an inner peripheral face of the tubular body 6 of the current collector 4. Accordingly, the positive and negative electrodes are not brought into contact with each other even when the electrodes become deformed. Furthermore, a diameter of the hole in the separator 3 is smaller than the diameter of the hole in the positive electrode 2. Therefore, the negative electrode 1 and the positive electrode 2 are completely separated from each other by the separator 3 in the vicinity of an outer peripheral face of the protrusion 5 of the end current collector 4T. Accordingly, the positive and negative electrodes are not brought into contact with each other even when the electrodes become deformed. The outer diameter of the separator 3 is smaller than the outer diameter of the positive electrode 2. Therefore, the separator 3 is not interposed between the positive electrode 2 and the tubular body 6 of the current collector 4. Furthermore, the diameter of the hole in the separator 3 is larger than the diameter of the hole at the center of the negative electrode 1. Therefore, the separator 3 is not interposed between the negative electrode 1 and the protrusion 5 of the end current collector 4T.

The current collector 4 and the end current collector 4T are stacked concentrically in the axial direction. The protrusion 5 of the current collector is lower in height than the tubular body 6 of the current collector. Therefore, the upper and lower current collectors 4 are not in contact with each other at a position near the center. In addition, an insulating sheet 14 is disposed between the current collector 4 and the end current collector 4T to insulate the upper and lower current collectors from each other. The insulating sheet 14 may be, for example, a polypropylene sheet.

The two current collectors 4, 4T and the electrode unit 11 enclosed with the current collectors 4, 4T constitute one cell 15. This cell is sandwiched between two terminal plates 16, 17. The cell and the terminal plates 16, 17 are joined with bolts 20 and are secured with nuts 21. A bipolar battery 10 is thus obtained. This embodiment employs double nuts as each of the nuts 21. The bolts 20 are coated with vinyl insulating tubes 22. The vinyl insulating tubes 22 prevent an electrical short circuit due to contact of the current collector 4 with the bolts 20 at a peripheral edge end of a flange 9 of the current collector 4. The vinyl insulating tubes 22 also prevent an electrical short circuit due to contact of the terminal plates 16, 17 with the bolts 20.

A hydrogen storage chamber 13 is formed in a space defined by the current collector 4 and the end current collector 4T and stores therein hydrogen gas supplied externally and hydrogen gas generated in the battery. In the battery according to this embodiment, when a negative electrode capacity is set to be smaller than a positive electrode capacity, hydrogen gas to be generated from the negative electrode in overcharging is stored in the hydrogen storage chamber 13. The hydrogen storage chamber 13 also functions as an electrolytic solution reservoir. The electrolytic solution is also retained in the separator 3.

The hydrogen gas stored in the hydrogen storage chamber 13 is bound to oxygen generated in the battery to form water. Therefore, the hydrogen gas plays a role of preventing the positive electrode 2 from being oxidized. As a result, the life characteristic of the positive electrode 2 is improved, and the negative electrode 1 is charged by the hydrogen gas.

The two current collectors 4, 4T are stacked concentrically in the axial direction of the bipolar battery 10 without being in contact with each other. The protrusion 5 of the current collector 4 is fitted in a hole formed at a center of the positive electrode terminal plate 17. A shoulder 8' of the end current collector 4T, which is not provided with a tubular body 6, is disposed on the negative electrode terminal plate 16. A shoulder 8 of the current collector 4 is in contact with the positive electrode terminal plate 17, so that the current collector 4 is electrically connected to the positive electrode terminal plate 17. In addition, the shoulder 8' of the end current collector 4T is in contact with the negative electrode terminal plate 16, so that the end current collector 4T is electrically connected to the negative electrode terminal plate 16.

The current collector 4 is connected to the positive electrode 2, and the end current collector 4T is connected to the negative electrode 1. Therefore, the positive electrode terminal plate 17 constitutes a positive electrode terminal, and the negative electrode terminal plate 16 constitutes a negative electrode terminal. Insulating washers 23a are respectively interposed between the left bolts 20a and the negative electrode terminal plate 16 to electrically insulate the bolts 20a from the negative electrode terminal plate 16. On the other hand, metal flat washers 24a are respectively interposed between the bolts 20a and the positive electrode terminal plate 17 to electrically connect the bolts 20a to the positive electrode terminal plate 17. The bolts 20a thus constitute positive electrode terminals. A positive electrode cable may be connected between the left nuts 21a.

Insulating washers 23b are respectively interposed between the right bolts 20b and the positive electrode terminal plate 17 to electrically insulate the bolts 20b from the positive electrode terminal plate 17. On the other hand, metal flat washers 24b are respectively interposed between the bolts 20b and the negative electrode terminal plate 16 to electrically connect the bolts 20b to the negative electrode terminal plate 16. The bolts 20b thus constitute negative electrode terminals. A negative electrode cable may be connected between the right nuts 21b. The insulating washers in this embodiment preferably have an insulating property and are made of polypropylene.

Of the four bolts 20, the left two bolts 20a constitute the positive electrode terminals, and the right two bolts 20b constitute the negative electrode terminals. Alternatively, of the four bolts 20, three bolts may constitute negative electrode terminals, and the remaining one bolt may constitute a positive electrode terminal. Still alternatively, of the four bolts 20, three bolts may constitute positive electrode terminals, and the remaining one bolt may constitute a negative electrode terminal.

A microcoupler 26 is mountable to the hole 7 in the current collector 4. The bipolar battery may be evacuated via the microcoupler 26. In addition, an electrolytic solution may be injected into the bipolar battery via the microcoupler 26. Moreover, hydrogen gas may be supplied from an external hydrogen storage source into the bipolar battery via the microcoupler 26. A mount port 28 for connecting the microcoupler 26 is also formed in the bottom of the negative electrode terminal plate 16.

Second Embodiment

Figure 3:
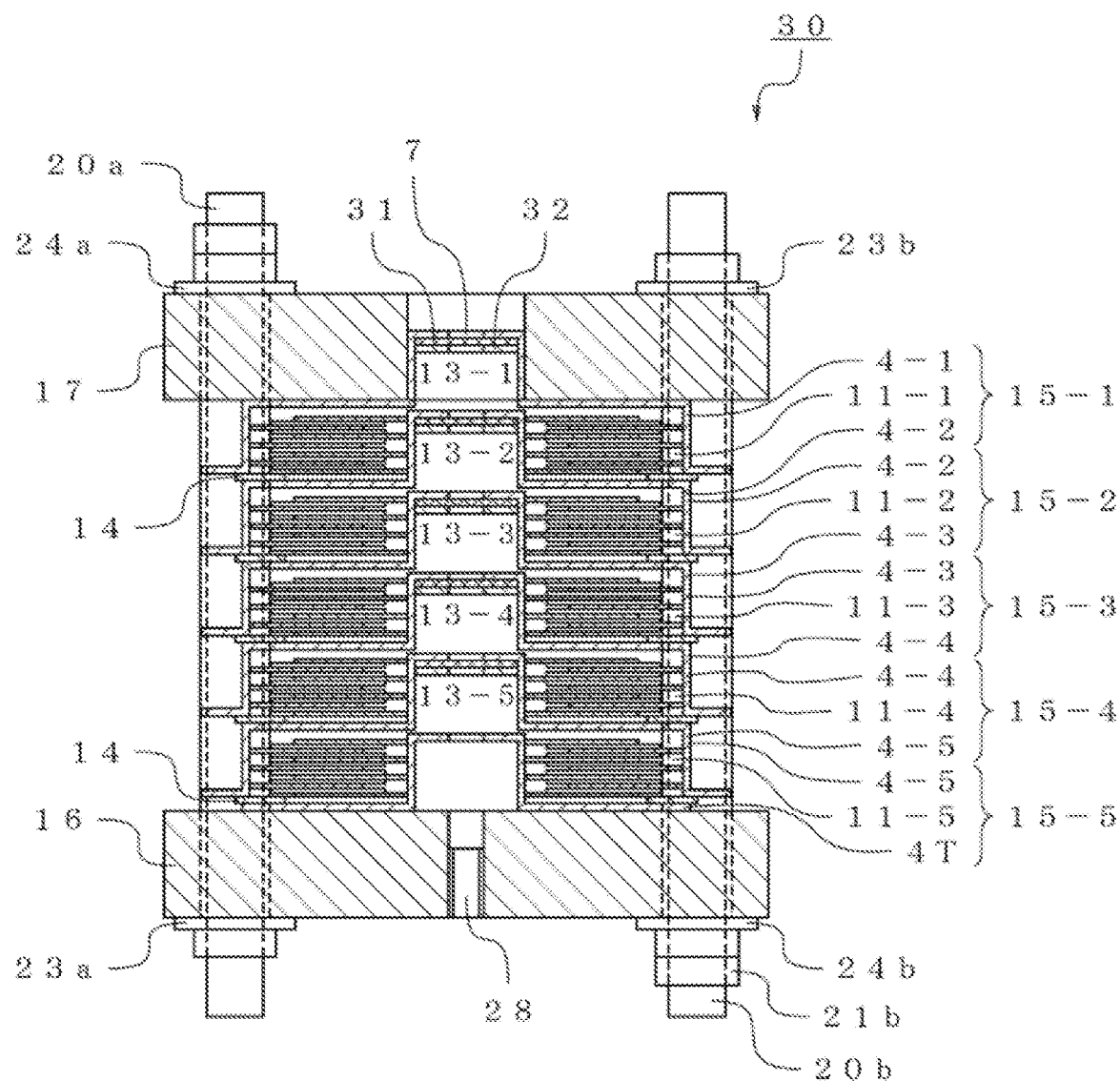
FIG. 3 is an axial sectional side view of a bipolar battery including five cells.

FIG. 3 is an axial sectional side view of a bipolar battery according to a second embodiment of the invention. A bipolar battery 30 illustrated in FIG. 3 includes five cells connected in series. A description will be mainly given of a difference from the first embodiment illustrated in FIG. 2B.

The bipolar battery 30 illustrated in FIG. 3 is equal to the bipolar battery 10 illustrated in FIG. 2B in the configuration in which left bolts 20a constitute positive electrode terminals and right bolts 20b constitute negative electrode terminals, but is different from the bipolar battery 10 illustrated in FIG. 2B in a configuration in which nuts 21b are disposed on a negative electrode terminal plate 16 side. In FIG. 2B, the negative electrode cable and the positive electrode cable are taken out in the same direction. In FIG. 3, on the other hand, a negative electrode cable and a positive electrode cable are taken out in mutually opposite directions. The direction of taking out an electrode cable is determined based on the convenience for handling of the electrode cable in assembling a battery pack.

Five current collectors 4-1 to 4-5 and one current collector 4T are stacked concentrically in an axial direction of the bipolar battery 30 without being in contact with one another. At this time, protrusions 5 of the respective current collectors 4-1 to 4-5 are directed upward. The current collectors 4 are electrically insulated from one another by insulating sheets 14. A protrusion 5 of the uppermost current collector 4-1 is fitted in a hole formed at a center of a positive electrode terminal plate 17. A shoulder 8' of the lowermost end current collector 4T is disposed on a negative electrode terminal plate 16. The use of the end current collector 4T which is not provided with a tubular body 6 eliminates a dead space in the battery and reduces a volume while maintaining a battery capacity.

An electrode unit 11 including a stack of a negative electrode 1, a positive electrode 2, and a separator 3 interposed between the negative electrode 1 and the positive electrode 2 is accommodated in a space defined by upper and lower two of the current collectors 4.

The two current collectors 4-1, 4-2 and the electrode unit 11-1 enclosed with the two current collectors 4-1, 4-2 constitute one cell 15-1. The current collector 4-1 is in contact with the positive electrode 2 at an inner face of its tubular body 6 to serve as a positive electrode current collector. The current collector 4-2 is in contact with the negative electrode 1 at its protrusion 5 to serve as a negative electrode current collector.

Likewise, the two current collectors 4-2, 4-3 and the electrode unit 11-2 enclosed with the two current collectors 4-2, 4-3 constitute a cell 15-2. The current collector 4-2 serves as a positive electrode current collector of the cell 15-2, and the current collector 4-3 serves as a negative electrode current collector of the cell 15-2. In addition, the current collectors 4-3, 4-4 and the electrode unit 11-3 enclosed with the current collectors 4-3, 4-4 constitute a cell 15-3. The current collectors 4-4, 4-5 and the electrode unit 11-4 enclosed with the current collectors 4-4, 4-5 constitute a cell 15-4. The current collectors 4-5, 4T and the electrode unit 11-5 enclosed with the current collectors 4-5, 4T constitute a cell 15-5. As described above, the bipolar battery 30 includes the cells 15-1 to 15-5 electrically connected in series.

A microcoupler (see FIG. 2B) is mounted to a hole 7 formed in the top side of the current collector 4-1, and an electrolytic solution is injected into the bipolar battery 30 at a predetermined pressure. The injected electrolytic solution spreads over the respective cells 15 through the holes 7 in the respective current collectors 4. An electrolytic solution injecting operation is not performed for each cell, but is performed once; therefore, the electrolytic solution injecting operation is simplified.

A disk-shaped water-repellent sheet 31 is disposed on an inner side of the protrusion 5 of each current collector 4 so as to cover the hole 7 of the protrusion 5. A holding plate 32 is disposed in the protrusion 5 to hold the position of the water-repellent sheet 31. The water-repellent sheet 31 allows hydrogen gas and an electrolytic solution supplied through the hole 7 in the protrusion 5 to pass therethrough. The water-repellent sheet 31 has micropores, so that hydrogen gas supplied into each cell circulates through the respective cells. The electrolytic solution in the cell is separated by the water-repellent sheet 31 having a property of repelling water, from the electrolytic solution in another cell. Therefore, a liquid junction due to the electrolytic solution does not occur between the cells.

The water-repellent sheet 31 may be a polyolefin nonwoven fabric and may be made of polypropylene or polyethylene. The water-repellent sheet 31 also acts as an insulative gasket. The water-repellent sheet 31 is not necessarily disposed on the inner side of the protrusion 5 as long as the water-repellent sheet 31 is disposed between the hole 7 and the electrode unit 11.

Figure 4A:
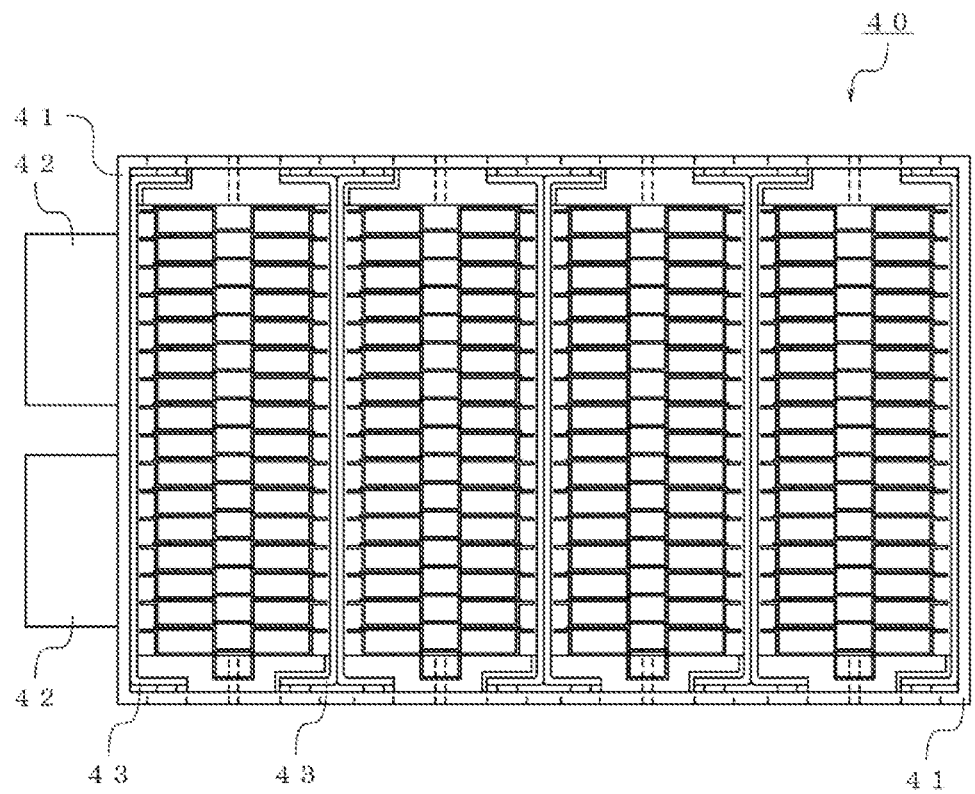
FIG. 4A is an assembly sectional view (side view) of a battery pack constituted of bipolar batteries.
Figure 4B:
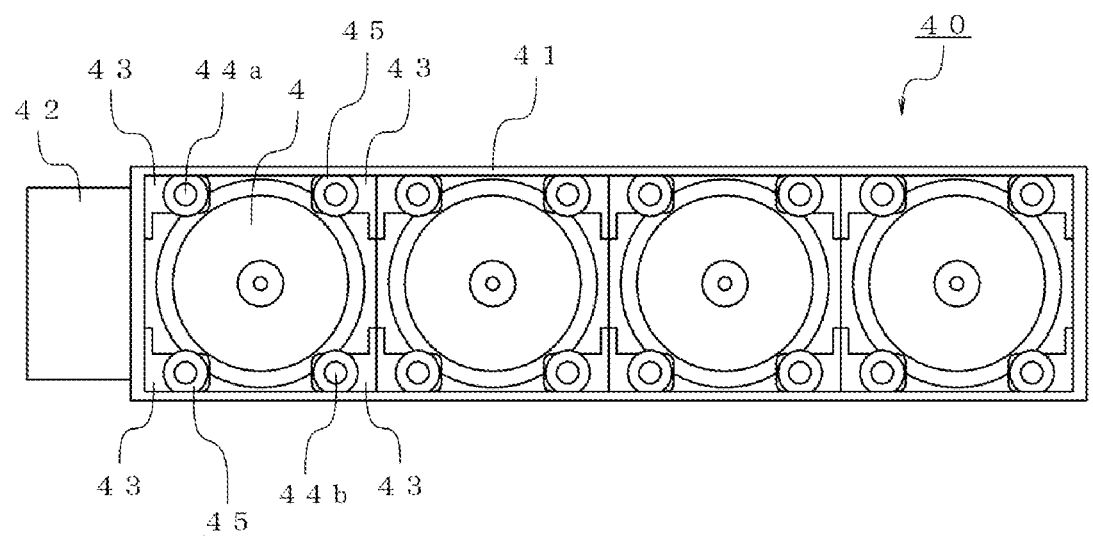
FIG. 4B is an assembly sectional view (plan view) of the battery pack constituted of the bipolar batteries.

FIG. 4A is an assembly sectional side view of a battery pack 40 constituted of bipolar batteries. FIG. 4B is an assembly plan view of the battery pack 40 constituted of the bipolar batteries. FIG. 4A does not illustrate electrode units for the sake of simplification of illustration. One bipolar battery includes a plurality of cells. The bipolar battery including five cells has been described with reference to FIG. 3. The battery pack 40 includes a resin battery casing 41 and four bipolar batteries accommodated in the battery casing 41. The battery pack 40 is provided with external cooling fans 42 for cooling. The cooling fans 42 suck cooling air from the outside and then supply the cooling air in a direction perpendicular to an axial direction of the bipolar batteries. The cooling air supplied into the battery casing 41 passes by outer faces of tubular bodies 6 of current collectors 4, is diffused by connection fittings 43, and is flown into the next bipolar battery. The connection fittings 43 disturb the flow of the cooling air to enhance a cooling effect.

Figure 5:
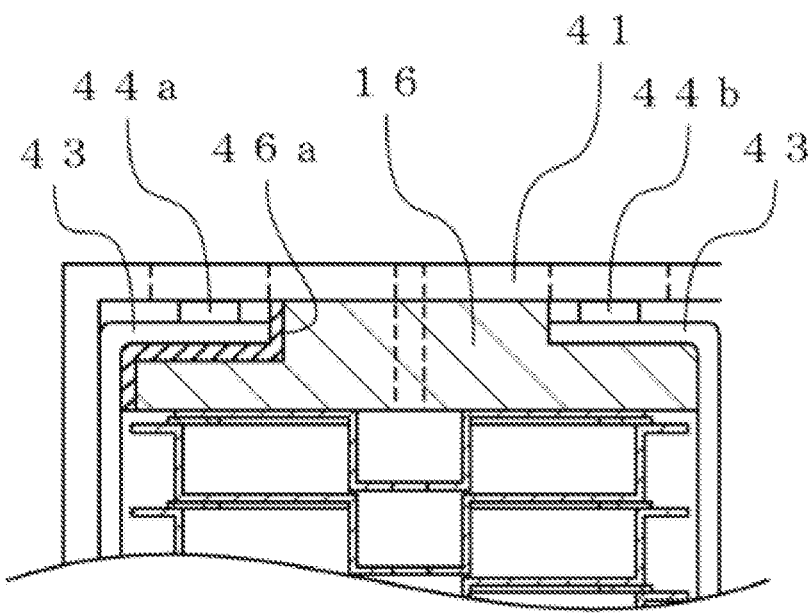
FIG. 5 is an enlarged view of two ends of a bipolar battery.
Figure 5:
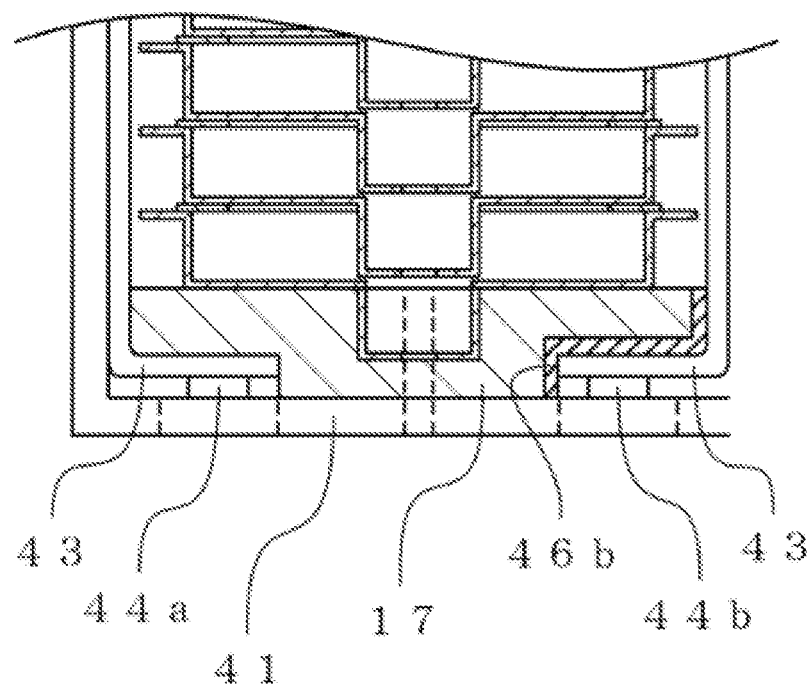

FIG. 5 is an enlarged sectional view of two ends of each bipolar battery. FIG. 5 does not illustrate the middle portion of the bipolar battery for the sake of simplification of illustration. The respective cells are secured with through-bolts 44a, 44b. The through-bolts 44 are coated with insulating tubes (not illustrated) that prevent a short circuit between the current collectors due to the through-bolts.

The connection fittings 43 are respectively secured at their two ends to the through-bolts 44 with nuts 45 (see FIG. 4B). Each of the connection fittings 43 is formed of a good electric conductor. In this embodiment, each of the connection fittings is made of aluminum. Since aluminum is lower in resistance than iron, the connection fittings 43 transmit electricity to the outside with a smaller ohmic loss than the through-bolts 44 made of iron.

Insulating members 46a are disposed between a negative electrode terminal plate 16 and the connection fittings 43 to prevent a short circuit in the bipolar battery due to the connection fittings 43. Likewise, insulating members 46b are disposed between a positive electrode terminal plate 17 and the connection fittings 43 to prevent a short circuit between the bipolar batteries due to the connection fittings 43. The through-bolts 44a serve as positive electrode terminals and the through-bolts 44b serve as negative electrode terminals, so that electricity is taken out from holes formed in the battery casing 41.

Figure 6:
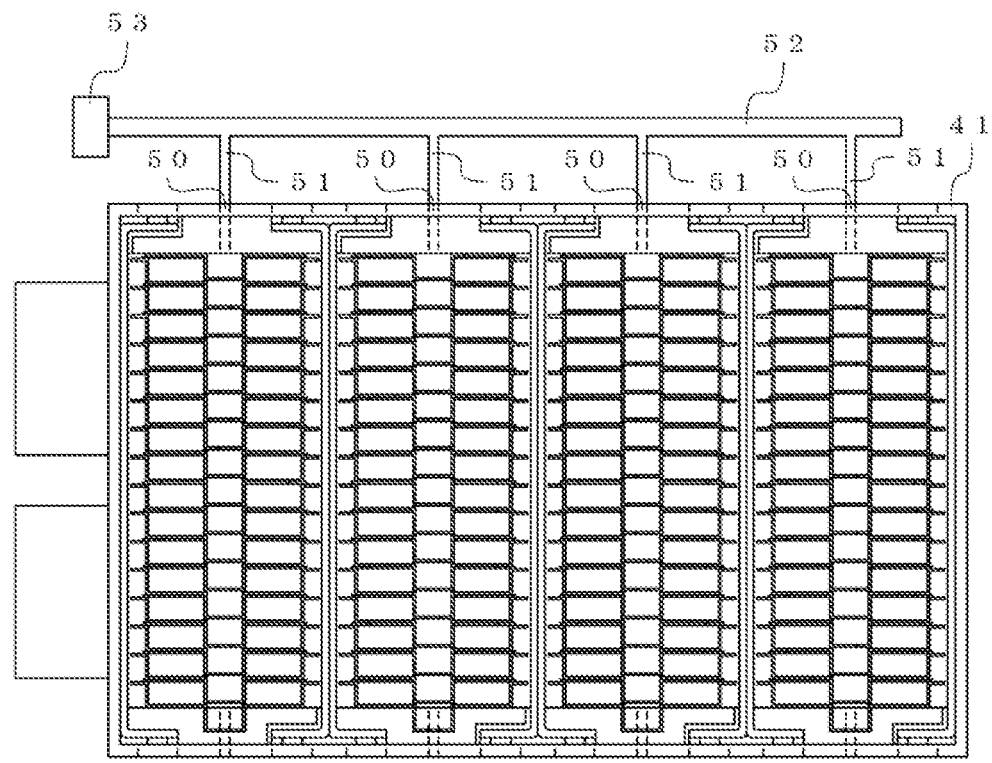
FIG. 6 illustrates pipes in a battery pack.

The battery pack according to this embodiment includes a safety valve that discharges gas from the respective bipolar batteries to the outside when the internal pressures of the bipolar batteries reach a predetermined value, for example, 1 Mpa. As illustrated in FIG. 6, specifically, gas discharge ports 50 provided on the battery casing 41 for the respective bipolar batteries are connected to one collecting pipe 52 via joint pipes 51. The collecting pipe 52 is provided at its end with the safety valve 53. When the internal pressures of the bipolar batteries become equal to or more than a specific value, the safety valve 53 operates to release the internal pressures of the bipolar batteries. The collecting pipe 52 may be provided with a pressure gauge.

Figure 7:
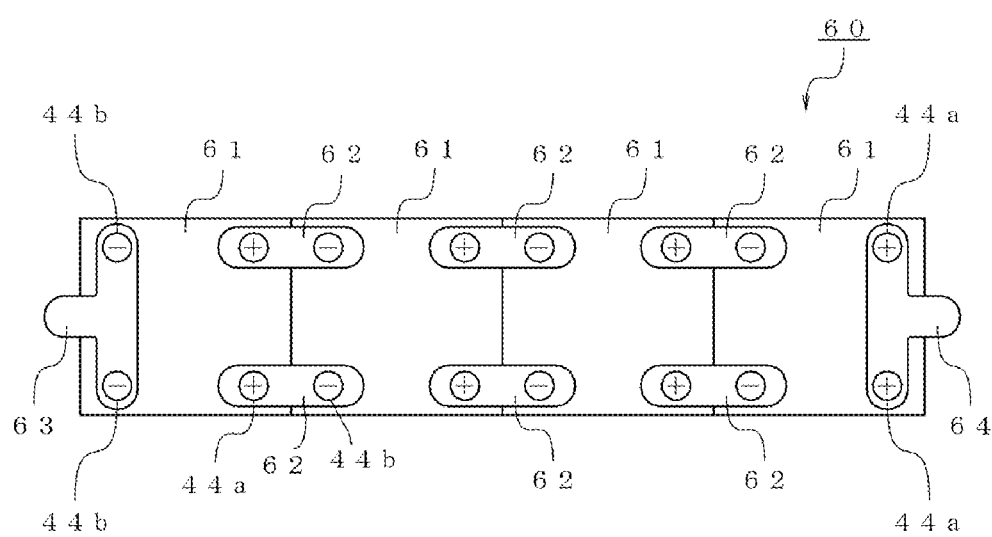
FIG. 7 illustrates a way of connecting bipolar batteries.
Figure 8A:
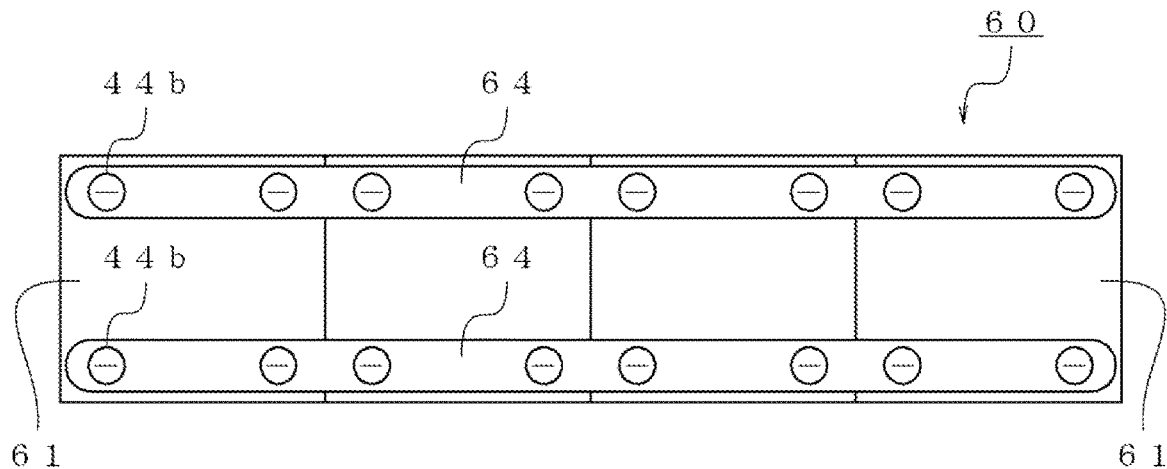
FIG. 8A illustrates another way of connecting bipolar batteries.
Figure 8B:
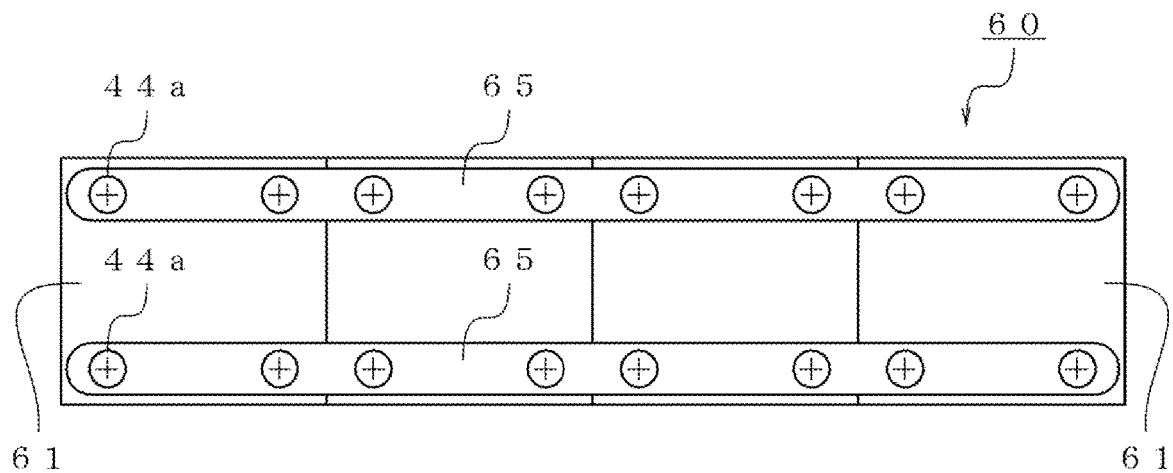
FIG. 8B illustrates still another way of connecting bipolar batteries.

FIGS. 7, 8A, and 8B each illustrate a way of connecting bipolar batteries to one another. FIG. 7 illustrates a configuration of a battery pack 60 including four bipolar batteries 61 connected in series. In adjacent two of the bipolar batteries 61, positive electrode terminals 44a and negative electrode terminals 44b are connected in series with joint bars 62. In a bipolar battery 61 located at one end of the battery pack 60, two negative electrode terminals 44b are connected to each other with a joint bar 63 to serve as a negative electrode terminal of the battery pack 60. In a bipolar battery 61 located at the other end of the battery pack 60, two positive electrode terminals 44a are connected to each other with a joint bar 64 to serve as a positive electrode terminal of the battery pack 60.

FIGS. 8A and 8B each illustrate a battery pack 60' including four bipolar batteries 61' connected in parallel. In the respective bipolar batteries 61', positive electrode terminals and negative electrode terminals are taken out in the same direction by adjusting positions where insulating members 46 are mounted. FIG. 8A illustrates adjacent two of the bipolar batteries 61' in which negative electrode terminals 44b are connected to each other with joint bars 64. FIG. 8B illustrates adjacent two of the bipolar batteries 61' in which positive electrode terminals 44a are connected to each other with joint bars 65. The joint bars 64 serve as negative electrode terminals of the battery pack 60', and the joint bars 65 serve as positive electrode terminals of the battery pack 60'.

Oxygen generated by a battery reaction is immediately bound to hydrogen filled in the battery to form water. Therefore, when hydrogen gas is filled in the battery, a conduction assisting agent contained in a positive electrode is not degraded by oxidation. Likewise, a hydrogen storage alloy is not oxidized, and therefore is prevented from being degraded. The life characteristic of the electrode is improved, and the longer battery life is expected.

INDUSTRIAL APPLICABILITY

A bipolar battery of the invention is suitably used as a consumer power storage apparatus in addition to an industrial power storage apparatus.

REFERENCE SIGNS LIST

1: Negative electrode
2: Positive electrode
3: Separator
4: Current collector, end current collector 4T
5: Protrusion
6: Tubular body
7: Hole
8: Shoulder
9: Flange
10: Bipolar battery
11: Electrode unit
13: Hydrogen storage chamber
14: Insulating sheet
15: Cell
16: Negative electrode terminal plate
17: Positive electrode terminal plate
18: Negative electrode terminal
19: Positive electrode terminal
20: Bolt
21: Nut
22: Insulating tube
23: Insulating washer
24: Flat washer
25: Compact nut
26: Microcoupler
30: Bipolar battery
31: Water-repellent sheet
32: Holding plate
40: Battery pack
41: Battery casing
42: Cooling fan
43: Connection fitting
44: Through-bolt
45: Nut
46: Insulating member
50: Gas discharge port
51: Joint pipe
52: Collecting pipe
53: Safety valve
60: Battery pack
61: Bipolar battery

The invention claimed is:
1. A bipolar battery comprising:
a plurality of current collectors; an electrolytic solution; and
at least one power generating element including a stack of a positive electrode, a negative electrode, and a separator interposed between the positive electrode and the negative electrode,
wherein
the current collectors are respectively formed of a one-end closed tubular conductor and have bottoms protruding outward to form protrusions,
the protrusions penetrate the power generating element along an axial direction of the current collectors,
a first electrode which is one of the positive electrode and the negative electrode is in contact with an inner face of a tubular body of a first current collector of the plurality of current collectors, is electrically connected to the first current collector, and is not in contact with a second current collector of the plurality of current collectors, and
a second electrode which is the other one of the positive electrode and the negative electrode is not in contact with the first current collector, is in contact with an outer face of a protrusion of the second current collector, and is electrically connected to the second current collector.

2. The bipolar battery of claim 1, wherein
the second electrode has an outer edge covered with the separator, and
the first electrode has a hole through which the second current collector passes, the hole having a peripheral edge covered with the separator.

3. The bipolar battery of claim 1, further comprising
an insulator interposed between the first current collector and the second current collector.

4. The bipolar battery of claim 1, further comprising
a water-repellent sheet disposed on an inner side of each of the current collectors and located between the corresponding protrusion and the power generating element.

5. The bipolar battery of claim 4, wherein
the water-repellent sheet is formed of a micro-porous film or a polyolefin nonwoven fabric.

6. The bipolar battery of claim 1, wherein the at least one power generating element comprises a plurality of power generating elements, a first electrode of one of the power generating elements is in contact with the inner face of the tubular body of the first current collector, and a second electrode of another one of the power generating elements is in contact with the outer face of the protrusion of the second current collector.

7. The bipolar battery of claim 1, wherein each of the current collectors is formed of a nickel-plated steel plate.

8. The bipolar battery of claim 1, further comprising:
a negative electrode terminal plate;
a positive electrode terminal plate; and
a through-bolt coated with an insulating tube and configured to join the negative electrode terminal plate and the positive electrode terminal plate together, with the current collectors stacked concentrically and sandwiched between the negative electrode terminal plate and the positive electrode terminal plate.

9. The bipolar battery of claim 8, further comprising
a connection fitting formed of a conductive flat member and mounted to two ends of the through-bolt,
the connection fitting including
a flat plate portion, and
an extension portion bent from the flat plate portion in a direction substantially perpendicular to a direction along the negative electrode terminal plate and the positive electrode terminal plate.

10. The bipolar battery of claim 8, wherein
of the stacked current collectors, an opening direction-end current collector is not provided with a tubular body.

11. The bipolar battery of claim 4, wherein
one of the first electrode and the second electrode is a negative electrode containing a hydrogen storage alloy, and the other electrode is a positive electrode containing a positive electrode active material and a conductive agent,
the conductive agent includes carbon, and
hydrogen gas is filled in the bipolar battery.

12. The bipolar battery of claim 11, further comprising
a hydrogen storage chamber configured to store hydrogen gas generated by electrolysis of the electrolytic solution retained in the bipolar battery and hydrogen gas supplied externally.

13. The bipolar battery of claim 11, wherein
the conductive agent includes partly graphitized soft carbon.

14. The bipolar battery of claim 11, wherein
the separator is formed of a polyolefin nonwoven fabric.

15. The bipolar battery of claim 11, wherein
the separator has a hydrophilic property.

16. A battery pack comprising:
a plurality of bipolar batteries each of which is the bipolar battery of claim 9, the bipolar batteries being arranged in a direction perpendicular to an axial direction of the bipolar batteries; and
an air blower configured to supply air in the direction perpendicular to the axial direction of the bipolar batteries,
wherein
the direction of supplying air from the air blower is parallel to a direction in which the extension portion of the connection fitting extends.

* * * * *